United States Patent [19]

Eaton

[11] Patent Number: 4,751,350
[45] Date of Patent: Jun. 14, 1988

[54] SEALING DEVICE AND RETENTION MEMBER THEREFOR

[75] Inventor: John W. Eaton, Palo Alto, Calif.

[73] Assignee: Raychem Corporation, Menlo Park, Calif.

[21] Appl. No.: 928,064

[22] Filed: Nov. 6, 1986

[51] Int. Cl.[4] .......................................... H02G 15/02
[52] U.S. Cl. .................... 174/87; 174/74 A; 174/93
[58] Field of Search ............... 174/87, 74 A, 93; 339/258 R, 258 A, 258 P, 258 RR; 439/430

[56] References Cited

U.S. PATENT DOCUMENTS

| | | | |
|---|---|---|---|
| 2,122,252 | 6/1938 | Hayes | 174/87 |
| 2,264,480 | 12/1941 | Owen | 294/93 |
| 2,870,239 | 2/1955 | Ustin | 174/87 |
| 2,925,461 | 2/1960 | Anderson | 174/87 |
| 3,019,284 | 1/1962 | Matthysse | 174/84 C |
| 3,288,914 | 11/1966 | Fuller et al. | 174/84 R |
| 3,483,310 | 12/1969 | Krup | 174/87 |
| 3,596,231 | 7/1971 | Melton | 439/426 |
| 3,934,076 | 1/1976 | Smith | 174/87 |
| 4,504,699 | 3/1985 | Dones et al. | 174/87 X |
| 4,585,295 | 4/1986 | Ackerman | 439/857 |
| 4,595,724 | 6/1986 | Koblitz | 524/409 |
| 4,600,261 | 7/1986 | Debbaut | 439/521 |
| 4,634,207 | 1/1987 | Debbaut | 174/76 X |
| 4,647,717 | 3/1987 | Uken | 174/74 A X |

FOREIGN PATENT DOCUMENTS

| | | | |
|---|---|---|---|
| 557587 | 5/1958 | Canada | 174/87 |
| 108518 | 5/1984 | European Pat. Off. | |
| 2628675 | 12/1977 | Fed. Rep. of Germany | 174/93 |

Primary Examiner—Morris H. Nimmo
Attorney, Agent, or Firm—Timothy H. P. Richardson; Herbert G. Burkard

[57] ABSTRACT

A sealing device comprising a cap having a closed end and an open end and a retention member engaged with the cap at the open end of the cap. The retention member comprises a plurality of resilient projections which may be defined in the following manner. The projections are inclined away from the body of the retention member and toward the closed end of the cap at an angle alpha ($\alpha$) with respect to the body wherein alpha is between about 90° and 135°. The projections have free inner ends defining a restricted opening. And the projections have, at their free inner ends, a chamfered surface facing away from the closed end of the cap which makes an angle theta ($\theta$) with respect to the longitudinal axis of the body wherein theta is between about 30° and 50°.

17 Claims, 3 Drawing Sheets

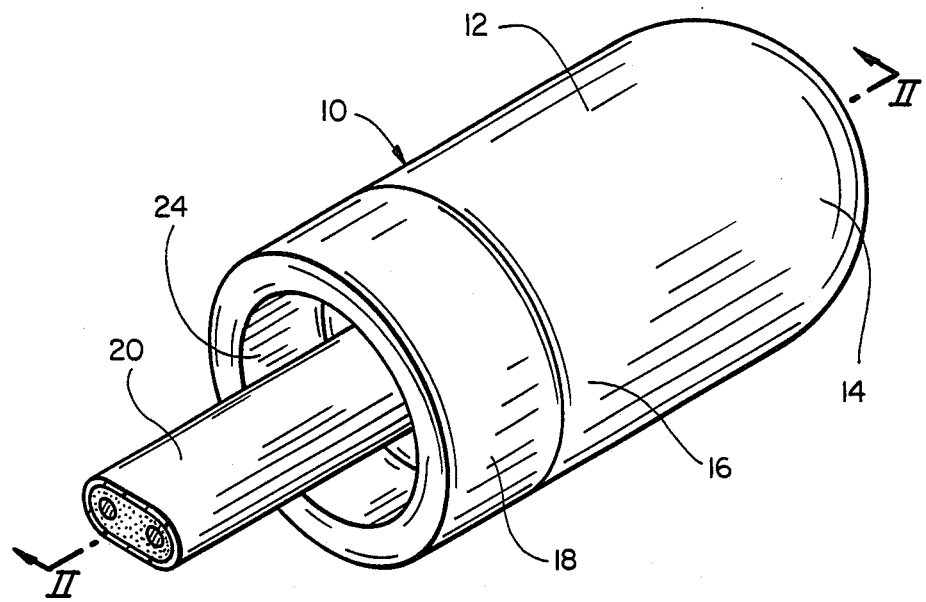
FIG_1
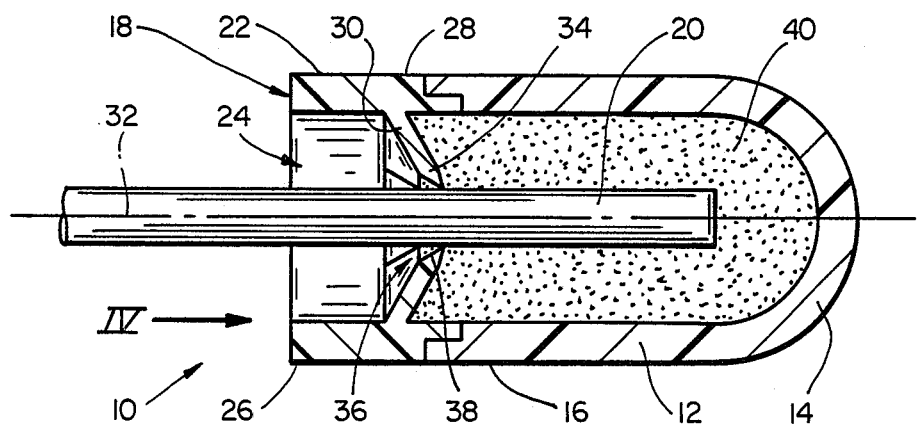
FIG_2

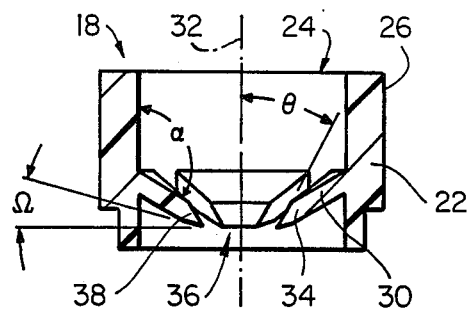
FIG_3
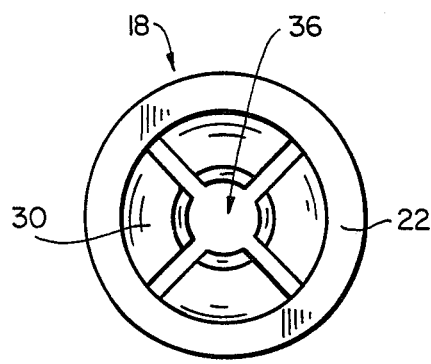
FIG_4
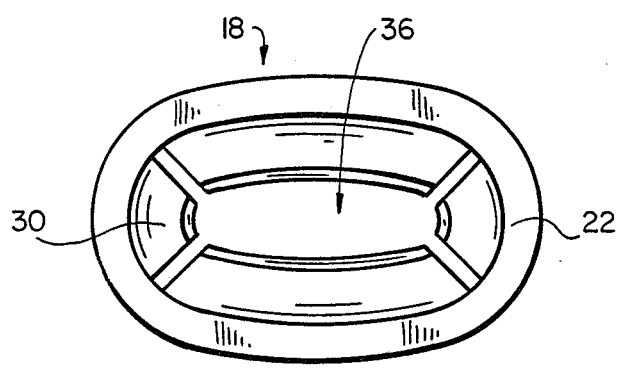
FIG_5

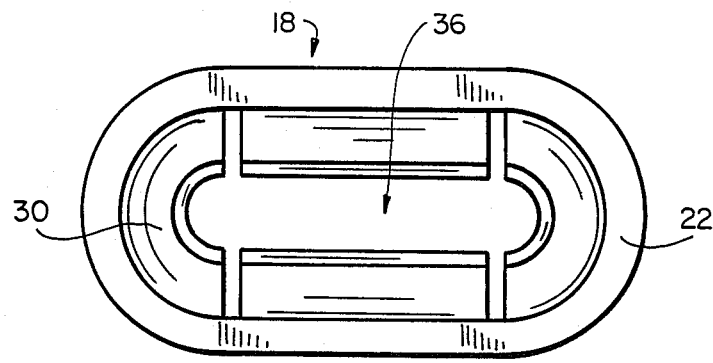
FIG_6
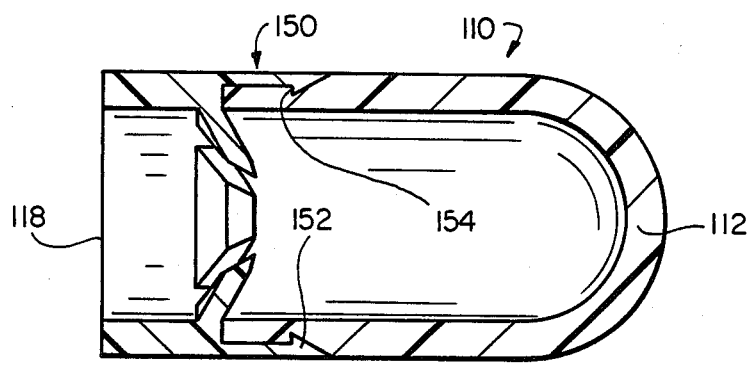
FIG_7
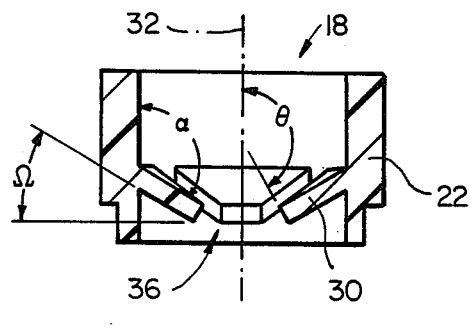
FIG_8

SEALING DEVICE AND RETENTION MEMBER THEREFOR

BACKGROUND OF THE INVENTION

This invention relates to the field of sealing members and, particularly, to those sealing members having means for aiding in the retention of a substrate therein.

Various solutions have been proposed for gripping and sealing a substrate. Among these are Ustin U.S. Pat. No. 2,870,239, Koblitz U.S. Pat. No. 4,595,724 and German OS No. 2,645,934, the disclosures of which are incorporated by reference herein. In Ustin, there is disclosed a cap having a retaining member therein. The retaining member has resilient projections extending inwardly from the rim of the retaining member to grip a substrate. Koblitz and the German reference also disclose projections or barbs which serve to grip a substrate.

However, none of these references appear to have attempted to optimize the performance or describe the specific geometry of the retaining member.

Ackerman U.S. Pat. No. 4,585,295, the disclosure of which is incorporated by reference herein, while not disclosing sealing, does disclose the adjustment of the retention member projections; however, there is only disclosed two angular adjustments —45° and 90° with respect to the central axis of the part. Matthysse U.S. Pat. No. 3,019,284, the disclosure of which is incorporated by reference herein, suggests modifying the free ends of the projections by adding teeth or by staggering the free ends.

Other retention members of peripheral interest are disclosed in Owen U.S. Pat. No. 2,264,480, Fuller et al. U.S. Pat. No. 3,288,914 and Melton U.S. Pat. No. 3,596,231, the disclosures of which are incorporated by reference herein.

Toy U.S. Pat. No. 4,721,832 discloses a sealing device comprising a flexible envelope, a gel and retaining means such as teeth or a crimp ring. Uken U.S. Pat. No. 4,647,717 discloses a gel-filled cap and retaining means consisting of a crimp ring. Both of these disclosures are incorporated by reference herein.

While these last two references disclose a sealing device having a gel and a retaining means, again there is no attempt to optimize the performance or describe the specific geometry of the retaining means.

It would be desirable to have a sealing device wherein the retaining means is optimized so that a substrate, particularly a jacketed conductor, could be easily inserted within the sealing device and yet be firmly held therein.

Thus, it is an object of the invention to have a sealing device and retaining means wherein the performance of the retaining means is optimized.

This and other objects will become more apparent after referring to the following description considered in conjunction with the accompanying drawings.

BRIEF SUMMARY OF THE INVENTION

There has been discovered a sealing device and retention member wherein the gripping of a substrate inserted therein has been greatly improved.

One aspect of the invention relates to a sealing device comprising a cap having a closed end and an open end and a retention member engaged with the cap at the open end of the cap. The retention member comprises a plurality of resilient projections which may be defined in the following manner. The projections are inclined away from the body of the retention member and toward the closed end of the cap at an angle alpha ($\alpha$) with respect to the body wherein alpha is between about 90° and 135°. The projections have free inner ends defining a restricted opening. And the projections have, at their free inner ends, a chamfered surface facing away from the closed end of the cap which makes an angle theta ($\theta$) with respect to the longitudinal axis of the body wherein theta is between about 30° and 50°.

Another aspect of the invention relates to the retention member itself as a separate article of commerce.

As will become apparent hereafter the retention member and the sealing device have been optimized so as to improve their performance.

BRIEF DESCRIPTION OF THE DRAWINGS

FIG. 1 is a perspective view of the sealing device and retention member according to the invention.

FIG. 2 is a sectional view of the sealing device and retention member in FIG. 1 along the lines II—II.

FIG. 3 is a sectional view of the retention member alone.

FIG. 4 is an end view of the retention member shown in FIG. 2 in the direction of arrow IV, with the substrate removed.

FIGS. 5 and 6 are similar to FIG. 4 showing further embodiments of the retention member according to the invention.

FIG. 7 is a sectional view similar to that shown in FIG. 2 showing a further embodiment of the sealing device and retention member according to the invention.

FIG. 8 is a sectional view similar to FIG. 3 showing a prior art configuration of the free inner ends of the projections.

DETAILED DESCRIPTION OF THE INVENTION

According to the invention there is disclosed a sealing device comprising a cap having a closed end and an open end and a retention member engaged with the cap at the open end thereof. The retention member comprises a generally tubular body having an opening at a first end and at a second end a plurality of resilient projections extending toward a longitudinal axis of the body and the cap. The projections:

(a) are inclined away from the first end of the body and toward the closed end of the cap and at an angle alpha ($\alpha$) with respect to the body wherein alpha is between about 90° and 135°;

(b) have free inner ends defining an opening smaller than the opening at the first end; and (c) have at the free inner ends a chamfered surface facing the first end of the body which makes an angle theta with respect to the longitudinal axis of the body, wherein theta ($\theta$) is between about 30° and 50°.

Referring to the figures in more detail and particularly referring to FIG. 1 there is shown a sealing device 10 according to the invention. The sealing device 10 comprises a cap 12 which has a closed end 14 and an open end 16 and a retention member 18. The retention member 18 is operatively engaged with the cap 12 at the open end 16 of the cap 12. A substrate 20, in this case a conductive polymer heater cable, is inserted into the retention member 18 and then into the cap 12. The other end of the heater cable (not shown) would be connected to a plug and power supply (also not shown). While the sealing device shown in FIG. 1 is particularly useful for sealing the end of a conductive polymer heater cable, it should be understood that the sealing device has uses other than for this heater cable and the invention is not to be limited in any way to this particular use of the sealing device.

Referring now to FIG. 2, the retention member 18 can be seen in more detail. The retention member 18 comprises a generally tubular body 22 having an opening 24 at a first end 26 and, at a second end 28, a plurality of resilient projections 30 extending toward a longitudinal axis 32 of the body 22 and the cap 12. The projections 30 have been optimized so as to improve the performance of the retention member 18 and therefore also the sealing device 10. The projections 30 are inclined away from the first end 26 of the body 22 and toward the closed end 14 of the cap 12. The projections 30 are also inclined at an angle alpha ($\alpha$) with respect to the body. The angle alpha will be described in more detail shortly. For the present, it is sufficient to say that angle alpha is between about 90° and 135°. The projections also have free inner ends 34 defining an opening 36 smaller than the opening 24 at the first end 26. Finally, the projections have, at their free inner ends 34, a chamfered surface 38 facing the first end 26 of the body 22 which makes an angle theta ($\theta$) with respect to the longitudinal axis of the body. The angle theta will also be discussed in more detail shortly. For the present, it should be understood that theta is between about 30° and 50°.

The retention member 18 alone is shown in FIG. 3. It can be seen that angle alpha is measured between the projections 30 and the generally tubular body 22 and will be at least 90° and preferably greater than 90°. Angle theta is measured from the longitudinal axis 32 of the retention member to the chamfered surface 38 and will be 0° or greater. Also shown in FIG. 3 is angle omega ($\Omega$) which measures the angle between the horizontal and the tip 34 of the projections 30.

As stated previously, alpha should be between about 90° and 135° and theta should be between 30° and 50°. It is preferable, however, that alpha be between about 110° and 130°. It is most preferred when alpha is about 120° and theta is about 30°. It is also most preferred that omega be about 30°.

As mentioned earlier, the retention member 18 is operatively engaged with the cap 12. So as to form a unitary article, it is most preferred that the retention member 18 and cap 12 be ultrasonically welded together. However, the retention member 18 and cap 12 may be joined together in other ways such as a press fit, snap fit or other similar manner.

To aid in the sealing function of the sealing device 10, it is most preferred that the sealing device further comprise a substance 40 which is principally contained in the cap 12. The substance 40 may be, by way of illustration and not of limitation, a grease, an adhesive sealant or any similar high viscosity substance such that a viscous flow of the substance tends to conform around an outer surface of an object suppressed therein and provides sealing therefor. Alternatively, the sealant material may be any of a number of gels currently available. For example the gel may be any one of the types disclosed in Debbaut U.S. Pat. Nos. 4,600,261 and 4,634,207; U.S. patent application Ser. No. 507,433 filed June 23, 1983; Ser. No. 756,559, filed July 17, 1985; and Ser. No. 892,519, filed July 31, 1986, the disclosures of which are incorporated by reference herein. Specifically, the gel is to have a cone penetration value from approximately 100 to 350 ($10^{-1}$ mm), preferably between 240 and 330, more preferably between 240 and 280 and most preferably between 250 and 270; an ultimate elongation of at least approximately 200%; and a cohesive strength greater than an adhesive strength of an exposed surface of the gel to itself or a similar gel. The stated parameters for the cone penetration and elongation are provided in accordance with the American National Standard Designation ASTM D217 and ASTM D738, respectively. A viscous flow of the gel is such that it tends to conform around an outer surface of an object suppressed therein, and exerting pressure on the gel increases the degree and quality with which the gel conforms to the object. While the retention member firmly retains the substrate in position, the substance 40 insures the sealing device against ingress of moisture or other environmental contaminant which would otherwise adversely impact the function of the substrate.

The shape of the retention member may be modified to fit the particular substrate or cable to be connected. For example, the tubular body of the retention member may be circular when viewed in crossection or from the end as shown in FIG. 4. Alternatively, the tubular body of the retention member may be oval as shown in FIG. 5 or oblong as shown in FIG. 6.

Due to the fact that the sealing device 10 is particularly suited for sealing the end of an electrically conductive cable, it is preferred that the sealing device be at least partly made from a non-conducting material. It is most preferred that the projections 30 are made from the non-conducting material so as to lessen the chance of grounding out the conductor or conductors of the cable. It is of course contemplated that the retention member 18 and the cap 12 will be entirely made from a non-conducting material so as to avoid any possibility of conduction from the cable to an adjacent surface.

Usually the retention member 18 and cap 12 will be made out of the same non-metallic material although this is not absolutely essential to the invention. It has been found, however, that the material must be carefully selected so as to give the projections certain desirable properties. It has been found that the properties of the projections 30 of the retention member 18 will be maximally optimized when the projections 30 at least and preferably also the entire retention member 18 are made from a polymeric material which has a flexural modulus of 300,000 to 400,000 psi. (However, it is believed that for certain applications, where greater stiffness is required such as when gripping a particularly tough substrate, a flexural modulus up to about 800,000 psi may be desirable.) The flexural modulus is important for the following reasons. If the flexural modulus is too low the retention member will have little strength to resist pull out of the substrate. On the other hand, if the flexural modulus is too high insertion of the substrate into the retention member will be extremely difficult. Thus, it has been found that the above noted flexural modulus is most preferred for the present invention.

A further embodiment of the invention is illustrated in FIG. 7. The sealing device 110 is substantially identical to sealing device 10 discussed previously except that now cap 112 and retention member 118 are operatively engaged by mechanical arrangement 150. Mechanical arrangement 150 consists of retention member tines 152 which clip onto ledge 154 of the cap 112.

The advantages of the invention will become more apparent after referring to the following test results.

Test Results

A number of retention members were constructed in order to determine the optimum configuration of the projections of the retention members. In this regard, several retention members were constructed as shown in FIG. 3. These retention members had a tubular body which had an outside diameter of 0.650 inches and an inside diameter of 0.450 inches. The thickness of the projections was about 0.05 inches and the diameter of the smaller opening defined by the projections was about 0.200 inches. These parts were constructed from ARDEL® which is a polyarylate available from Union Carbide. ARDEL has a flexural modulus of about 310,000 psi.

Each retention member was tested in an INSTRON tensile testing machine as follows. A heater cable sample was held in one jaw of the INSTRON while the retention member was held in the other jaw. The jaws were moved together while the force to insert the cable in the retention member was measured. Next, the jaws of the INSTRON were moved apart while the force to pull the heater cable out from the retention member was measured.

The results of the testing are illustrated in Table I. In the first group of results, Group A, the optimum angle alpha was initially determined. Alpha was varied while the angle theta was held approximately constant. The angle omega was not held constant but this is believed not to have substantially affected the accuracy of the results as will become apparent hereafter. As can be seen from Table I, the angle of alpha corresponding to 120° had the greatest amount of pull force (38.8 pounds) which indicates its resistance to pull out of the heater cable from the retention member. While a pull out force of 23 pounds for an alpha of 90° would ordinarily be satisfactory, there may be circumstances where a much greater pull out force is necessary in which case alpha, to be optimized, should be about 120°.

Once alpha has been determined then it was necessary to determine theta while holding alpha and omega constant. It is believed that theta has the most effect on the performance of the projections. As shown in Group B of Table I, varying theta from 0° to 60° had a dramatic impact on the performance on the retention members. At 0° no insertion of the cable was possible. On the other hand at 60° insertion of the cable was possible but the pull out force was too low. Theta at 40° and 50° would be satisfactory for many applications but theta at about 30° is clearly the preferred angle.

It should also be noted at this time that for many applications an extraordinarily high insertion force would be undesirable as this would make it very difficult to insert a substrate into the retention member. For example, in Group A where alpha was 90°, the insertion force was 7.2 pounds, which would be undesirable for certain consumer applications. If the substrate was a jacketed conductor the high insertion force exerted by the retention member projections could cause damage to the cable jacket. Thus, it is desirable that the insertion force not be too high and for many consumer applications it is preferred that this insertion force be about 4 pounds. Thus it can be seen that with alpha at 120° and theta at 30° an insertion force of 4½ pounds (or 4 pounds in Group A) is extremely desirable while a pull force of 34½ pounds (or 38.8 pounds in Group A) has been maximized. It must be appreciated, then, that proper application of the teaching of the invention requires a balancing of the insertion force and the pull force so that a substrate may be inserted into the retention member with relative ease and yet be firmly held therein with sufficient force to resist pull out.

The effect of omega was then determined as illustrated by the results in Group C. Alpha and theta were held constant while omega was varied from 0° to 30°. It can be seen that, except for omega at 0°, the varying of omega had little effect on the insertion force as well as on the pull out force. The end result is that the most preferred angle for omega was chosen to be 30° which equals the preferred angle alpha of 120° minus 90°. Thus, the tip of each of the projections will be in linear alignment with the remainder of each of the projections.

Many of the prior art references (eg. Ackerman, U.S. Pat. No. 4,585,295) show an angle of theta of 90° or more at the free inner end of the projections. Such a configuration is also illustrated in FIG. 8. The configuration of FIG. 8 was tested in a manner similar to the configurations discussed earlier. The results are listed in Table I, Group D. It can be observed that while insertion force is high, pull force is low. Thus, the results for both insertion force and pull force are unsatisfactory.

As alluded to earlier, it is important to maximize pull force without inordinately increasing insertion force. The success of this balancing may be measured by the Index noted in the last column of Table I. This Index is simply the pull force divided by the insertion force for any given sample. In general, the higher the Index, the better the retention member. Thus, in Group C, the retention member having alpha=120°, theta=30° and omega=30° had an Index of 9.7 while the prior art retention member (in Group D) had an Index of 1.0. Accordingly, it is apparent that the prior art retention member is markedly inferior.

Shown in Table II are each of the materials which were evaluated for use as the retention member. In Group I are the materials which had a flexural modulus which was too low. On the other hand, the materials in Group II represent those materials which had a flexural modulus which was too high. The materials in Group III represent those materials which have a flexural modulus in the right range. Also shown in Table II is the notched izod impact for each of the materials. Under certain circumstances it may be necessary to have a material with high impact resistance. In that case certain of the materials, such as NYLON 6,6 may have to be eliminated from the group of preferred materials. For the purposes of the present invention, however, the preferred material is LEXAN.

TABLE I

|    | α, deg. | θ, deg. | Ω, deg. | Insertion Force, Lbs. | Pull Force, Lbs. | Index |
|----|---------|---------|---------|-----------------------|------------------|-------|
| A. | 90      | 40      | 0       | 7.2                   | 23.0             | 3.2   |
|    | 105     | 30      | 15      | 7.4                   | 22.5             | 3.0   |
|    | 120     | 30      | 30      | 4.0                   | 38.8             | 9.7   |
|    | 135     | 40      | 30      | 4.0                   | 33.2             | 8.3   |
| B. | 120     | 0       | 10      | no insertion possible | —                | —     |
|    | 120     | 30      | 10      | 4.5                   | 34.5             | 7.7   |
|    | 120     | 40      | 10      | 6.2                   | 27.5             | 4.4   |
|    | 120     | 50      | 10      | 8.1                   | 26.0             | 3.2   |
|    | 120     | 60      | 10      | 6.8                   | 13.0             | 1.9   |
| C. | 120     | 30      | 0       | 6.2                   | 26.0             | 4.2   |
|    | 120     | 30      | 10      | 4.5                   | 32.8             | 7.3   |

TABLE I-continued

| | α, deg. | θ, deg. | Ω, deg. | Insertion Force, Lbs. | Pull Force, Lbs. | Index |
|---|---|---|---|---|---|---|
| | 120 | 30 | 15 | 4.0 | 35.0 | 8.8 |
| | 120 | 30 | 20 | 4.0 | 35.0 | 8.8 |
| | 120 | 30 | 30 | 4.0 | 38.8 | 9.7 |
| D. | 120 | 150 | 30 | 10.0 | 10.0 | 1.0 |

TABLE II

| Material | Flexural Modulus, psi @ 23° C. | Notched IZOD impact, lbs. |
|---|---|---|
| Group I | | |
| DELRIN 100 ST (Acetal/Dupont) | 200,000 | 17.0 |
| ZYTEL ST801 (Nylon/Dupont) | 245,000 | 17.0 |
| Polypropylene | 200,000 | 0.4–1.0 |
| Group II | | |
| Polyester/30% glass | 1,100,000 | 1.3 |
| Polyphenelene Sulfide | 1,700,000 | 1.4 |
| Group III | | |
| ARDEL (polyarylate/Union Carbide) | 310,000 | 4.2 |
| LUSTRAN 648 (ABS/Monsanto) | 310,000 | 4.7 |
| LEXAN 141 (polycarbonate/GE) | 325,000 | 17.0 |
| UDEL (polysulfone/Union Carbide) | 390,000 | 1.3 |
| DELRIN 500 (Acetal/Dupont) | 410,000 | 1.4 |
| NYLON 6,6 (Celanese) | 420,000 | 0.8–1.0 |

It will be apparent to those skilled in the art having regard to this disclosure that other modifications of this invention beyond those embodiments specifically described here may be made without departing from the spirit of the invention. Accordingly, such modifications are considered within the scope of the invention as limited solely by the appended claims.

I claim:

1. A sealing device comprising:
  a cap having a closed end and an open end; and
  a retention member engaged with the cap at the open end thereof;
  the retention member comprising a generally tubular body having an opening at a first end and, at a second end, a plurality of resilient projections extending toward a longitudinal axis of the body and the cap;
  the projections:
    (a) being inclined inwardly of the body away from the first end of the body and toward the closed end of the cap and at an angle α defined on a longitudinal section of the retention member between the projection and the internal wall of the body, wherein α is between about 90° and 135°;
    (b) having free inner ends defining an opening smaller than the opening at the first end; and
    (c) having at the free inner ends a chamfered surface facing the first end of the body which makes an angle θ with respect to the longitudinal axis of the body, wherein θ is between about 30° and 50°.

2. The sealing device of claim 1 wherein the generally tubular body of the retention member is circular when viewed in crossection.

3. The sealing device of claim 1 wherein the generally tubular body of the retention member is oval when viewed in crossection.

4. The sealing device of claim 1 wherein angle α of the projections is between about 110° and 130°.

5. The sealing device of claim 4 wherein α is about 120° and θ is about 30°.

6. The sealing device of claim 1 wherein at least the projections are made from a polymeric material having a flexural modulus of 300,000 to 400,000 psi.

7. The sealing device of claim 1 further comprising a gel contained in the cap wherein the gel has a cone penetration value from approximately 100 to 350 ($10^{-1}$ mm) and an ultimate elongation of at least approximately 200%.

8. The sealing device of claim 1 further comprising a sealing substance selected from the group consisting of a grease, an adhesive sealant or any similar high viscosity substance.

9. A retention member comprising;
  a generally tubular body having an opening at a first end and, at a second end, a plurality of resilient projections extending toward a longitudinal axis of the body;
  the projections:
    (a) being inclined inwardly of the body away from the first end of the body at an angle α defined on a longitudinal section of the retention member between the projection and the internal wall of the body, wherein α is between about 90° and 135°;
    (b) having free inner ends defining an opening smaller than the opening at the first end; and
    (c) having at the free inner ends a chamfered surface facing the first end of the body which makes an angle θ with respect to the longitudinal axis of the body, wherein the θ is between about 30° and 50°.

10. The retention member of claim 9 wherein the generally tubular body is circular when viewed in crossection.

11. The retention member of claim 9 wherein the generally tubular body is oval when viewed in crossection.

12. The retention member of claim 9 wherein α is between about 110° and 130°.

13. The retention member of claim 12 wherein α is about 120° and θ is about 30°.

14. The retention member of claim 9 wherein at least the projections are made from a polymeric material having a flexural modulus of 300,000 to 800,000 psi.

15. The retention member of claim 14 wherein the flexural modulus is 300,000 to 400,000 psi.

16. The sealing device of claim 1 wherein the generally tubular body is oblong when viewed in crossection.

17. The retention memebr of claim 9 wherein the generally tubular body is oblong when viewed in crossection.

* * * * *